No. 765,748. PATENTED JULY 26, 1904.
H. J. NOLL.
INSECT CATCHING AND PLANT SPRAYING MACHINE.
APPLICATION FILED MAR. 28, 1904.
NO MODEL. 3 SHEETS—SHEET 1.
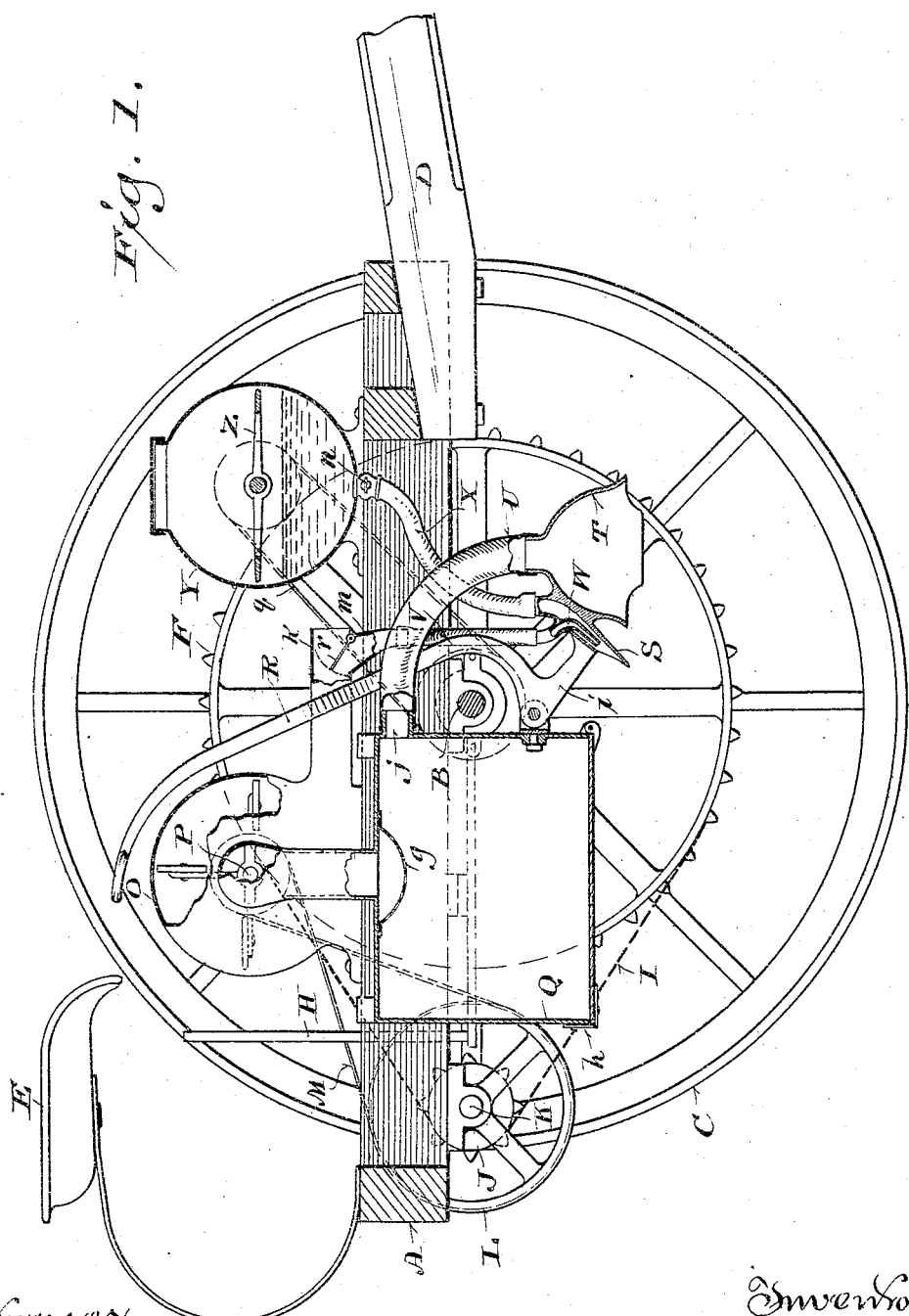
Witnesses
Geo. W. Young
N. E. Oliphant
Inventor
Henry John Noll
By H. G. Underwood
Attorneys No. 765,748. PATENTED JULY 26, 1904.
H. J. NOLL.
INSECT CATCHING AND PLANT SPRAYING MACHINE.
APPLICATION FILED MAR. 28, 1904.
NO MODEL. 3 SHEETS—SHEET 2.
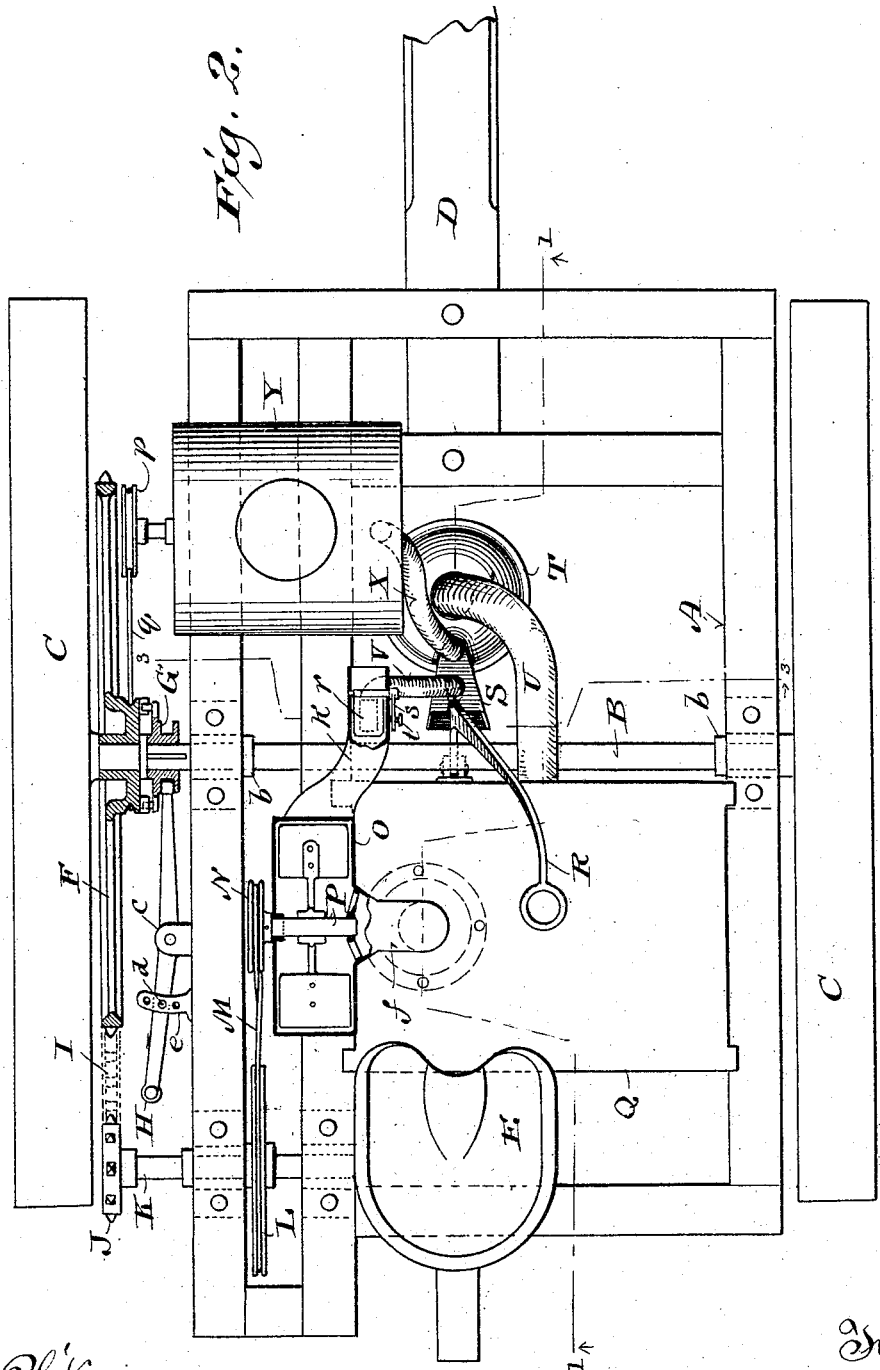
Witnesses
Geo. W. Young.
N. E. Oliphant
Inventor
Henry John Noll,
By H. G. Underwood
Attorneys

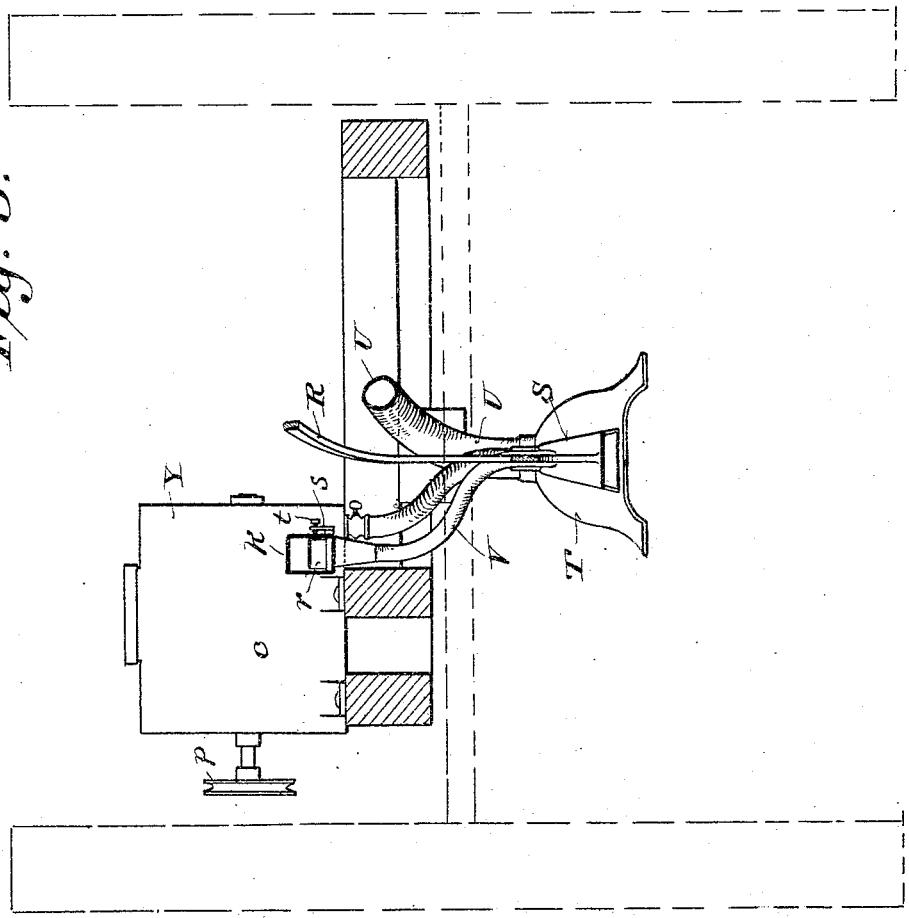

No. 765,748. Patented July 26, 1904.

UNITED STATES PATENT OFFICE.

HENRY JOHN NOLL, OF MILWAUKEE, WISCONSIN.

INSECT-CATCHING AND PLANT-SPRAYING MACHINE.

SPECIFICATION forming part of Letters Patent No. 765,748, dated July 26, 1904.

Application filed March 28, 1904. Serial No. 200,311. (No model.)

*To all whom it may concern:*

Be it known that I, HENRY JOHN NOLL, a citizen of the United States, and a resident of Milwaukee, in the county of Milwaukee and State of Wisconsin, have invented certain new and useful Improvements in Insect-Catching and Plant-Spraying Machines; and I do hereby declare that the following is a full, clear, and exact description thereof.

My invention consists in what is hereinafter particularly set forth with reference to the accompanying drawings and subsequently claimed, the object of the invention being to provide simple economical machines for catching insects from plants and for spraying the plants with insecticide, the operations being performed singly or together, as may be most desirable.

Figure 1 of the drawings represents a vertical longitudinal section view of a machine in accordance with my invention, the same being indicated by lines 1 1 in the second figure; Fig. 2, a plan view of the machine, partly in horizontal section; and Fig. 3, a rear elevation of a fragment of said machine, partly in transverse section, on lines 3 3 in said second figure.

Referring by letter to the drawings, A indicates a carriage-frame, of any suitable material and construction, provided with bearings for a shaft B, that constitutes an axle to which traction-wheels C are rigidly connected, collars $b$ being arranged on said shaft adjacent to side pieces of the frame. A draft-tongue D is connected to the frame, and a driver's seat E is shown in spring connection with said frame.

Loose on the main shaft A is a large sprocket-wheel F, the hub of which is made to constitute a clutch member, the other sliding member G of the clutch being splined on said shaft. The clutch member G is actuated by a right-angle lever H, fulcrumed in connection with a bracket $c$ of the frame A, and a pin $d$ is employed in apertures of the lever and another bracket $e$ of said frame to hold the sliding clutch member in or out of engagement with the hub of the aforesaid sprocket-wheel. This sprocket-wheel being clutched to rotate with the shaft B, its motion is conveyed by a link belt I to another but smaller sprocket-wheel J, fast on a counter-shaft K, for which the frame A is provided with bearings.

A large pulley L on the counter-shaft is connected by a belt M with another but smaller pulley, N, fast on the shaft P of a rotary fan that has its casing O mounted on the frame A, the inlet of the casing being a spout $f$, that communicates with a receptacle Q in suspension on said frame. A perforated shield $g$ is arranged in the receptacle Q to protect the spout $f$, and the bottom of said receptacle has hinge connection with the remainder thereof to open downward, suitable latches $h$ being employed to hold said bottom in its position to close the aforesaid receptacle.

In universal-joint connection with the front of the receptacle Q is a hand-lever R, and an arm $i$ of this lever is rigid with a nozzle S on the back of a hood T, that is open at the top in connection with a flexible pipe U, joined to an upper forward nipple $j$ of said receptacle.

The outlet-flue $k$ of the fan-casing O has a depending spout $m$, connected by a flexible pipe V with a nozzle W, that is partly incased by the nozzle S aforesaid, both nozzles having their discharge in the same direction back of the adjacent hood. The nozzle S is connected by a flexible pipe X with a faucet $n$ of a receptacle Y, mounted on the frame A, and within this receptacle is a rotary stirrer Z, the shaft of which is fast in a pulley $p$, connected by a belt $q$, that runs in an annular groove of the hub of the sprocket-wheel F, above specified.

A trap-valve $r$ is arranged in the outlet-flue of the fan-casing to open and close the spout $m$, and an arm $s$ of the outwardly-extended valve-stem is provided with a set-screw $t$, that binds against said flue to hold the valve in adjusted position.

The machine is driven to have the hood T pass over growing plants, this hood being raised and lowered and moved from side to side by means of the hand-lever R, as may be found necessary by the driver of the machine in order to obtain the best results. The fan being in motion, insects from the plants are sucked into the receptacle Q, the shield or screen $g$ in said receptacle preventing them from being carried up the adjacent spout. From time to time the bottom of the receptacle Q is swung down to remove the captured insects.

The receptacle Y is designed to carry insecticide powder or liquid, and its faucet being open there is feed of the insecticide through the pipe X to the nozzle S, where it commingles with a blast of air discharged from the nozzle W if the valve *r*, controlling the spout *m*, be more or less open, the result being a scattering of said insecticide on the plants over which the hood T has passed. The stirrer Z in the receptacle Y agitates the insecticide and prevents it from clogging the faucet through which it is fed.

Having thus described my invention, what I claim as new, and desire to secure by Letters Patent, is—

1. The combination of the carriage comprising a frame, a main shaft and traction-wheels; a rotary fan and its casing on the carriage-frame, clutch-controlled gearing connecting the fan-shaft with a rotary member of the carriage, a receptacle connected to said carriage-frame and having communication with the fan-casing, and a lever-controlled vertically and laterally adjustable hood having flexible pipe connection with said receptacle.

2. The combination of the carriage comprising a frame, a rotary main shaft and traction-wheels; these wheels being fast on the shaft, a rotary fan and its casing on the carriage-frame, a sprocket-wheel in clutch-controlled connection with said shaft, a counter-shaft geared to the fan-shaft and provided with a sprocket-wheel having link-belt connection with the sprocket-wheel aforesaid, a receptacle connected to said carriage-frame and having communication with the fan-casing, and a lever-controlled vertically and laterally adjustable hood having flexible pipe connection with said receptacle.

3. The combination of a carriage comprising a frame, a main shaft and traction-wheels; a rotary fan and its casing on the carriage-frame, clutch-controlled gearing connecting the fan-shaft with a rotary member of the carriage, a receptacle having communication with the fan-casing, a perforated shield guarding the air-outlet from the receptacle, and a lever-controlled vertically and laterally adjustable hood having flexible pipe connection with said receptacle.

4. The combination of the carriage comprising a frame, a main shaft and traction-wheels; a rotary fan and its casing on the carriage-frame, clutch-controlled gearing connecting the fan-shaft with a rotary member of the carriage, an insecticide-receptacle on said carriage-frame provided with a faucet, a lever-controlled vertically and laterally adjustable nozzle in flexible pipe connection with said faucet, and another nozzle within the one aforesaid having flexible pipe connection with a valve-controlled spout of the outlet-flue of the fan-casing.

5. The combination of the carriage comprising a frame, a main shaft and traction-wheels; a rotary fan and its casing on the carriage-frame, clutch-controlled gearing connecting the fan-shaft with a rotary member of the carriage, an insect-receptacle and an insecticide-receptacle in connection with the carriage-frame, the insect-receptacle being in communication with the fan-casing, a lever-controlled vertically and laterally adjustable hood having flexible pipe connection with said insect-receptacle, a nozzle on the back of the hood in flexible pipe connection with a faucet of the insecticide-receptacle, another nozzle partly within the one on said hood, a spout of the outlet-flue of said fan-casing in flexible pipe connection with the inner nozzle, and an adjustable trap-valve arranged in said flue to control said spout.

6. The combination of the carriage comprising a frame, a main shaft and traction-wheels; a rotary fan and its casing on the carriage-frame, clutch-controlled gearing connecting the fan-shaft with a rotary member of the carriage, an insecticide-receptacle on said carriage-frame provided with a faucet, a rotary stirrer in the receptacle in gear with said rotary member of the carriage, a lever-controlled vertically and laterally adjustable nozzle in flexible pipe connection with said faucet, and another nozzle within the one aforesaid having flexible pipe connection with a valve-controlled spout of the outlet-flue of the fan-casing.

In testimony that I claim the foregoing I have hereunto set my hand, at Milwaukee, in the county of Milwaukee and State of Wisconsin, in the presence of two witnesses.

HENRY JOHN NOLL.

Witnesses:
N. E. OLIPHANT,
R. J. BARSCH.